G. YANACOPOULOS.
WIND MOTOR FOR AIR PUMPS.
APPLICATION FILED APR. 5, 1919.
1,369,596.
Patented Feb. 22, 1921.
2 SHEETS—SHEET 2.
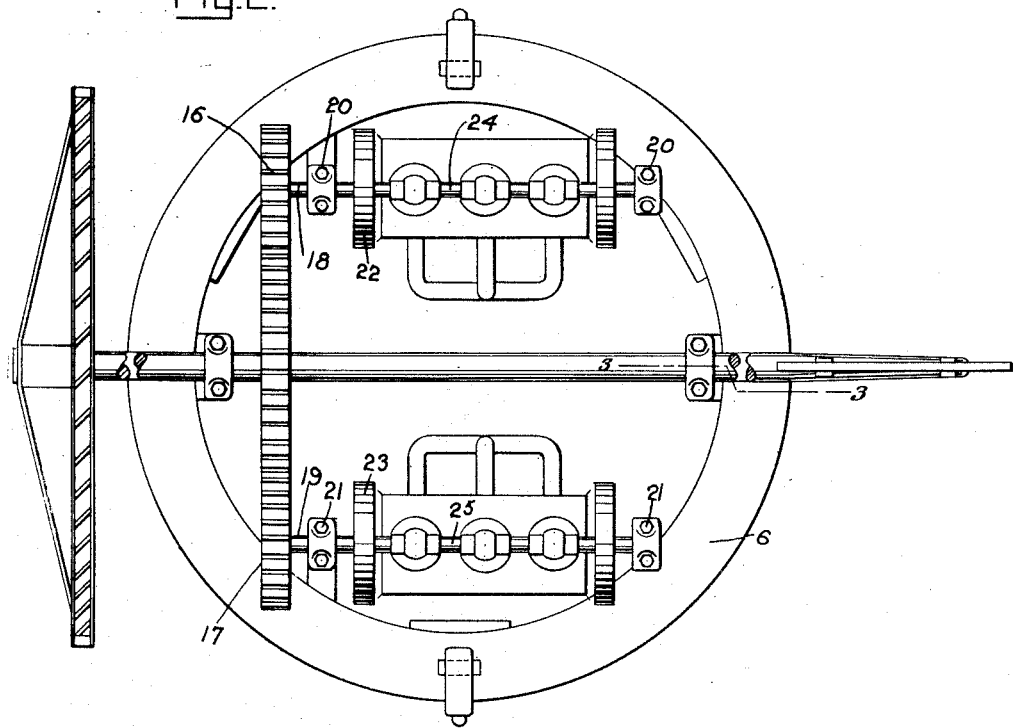
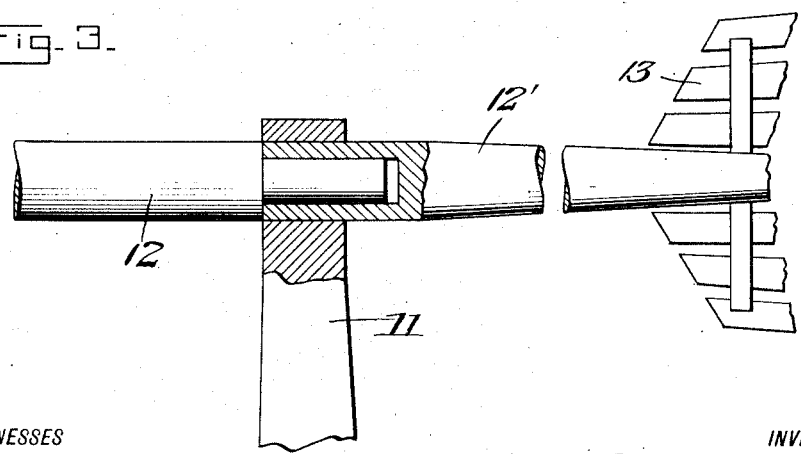

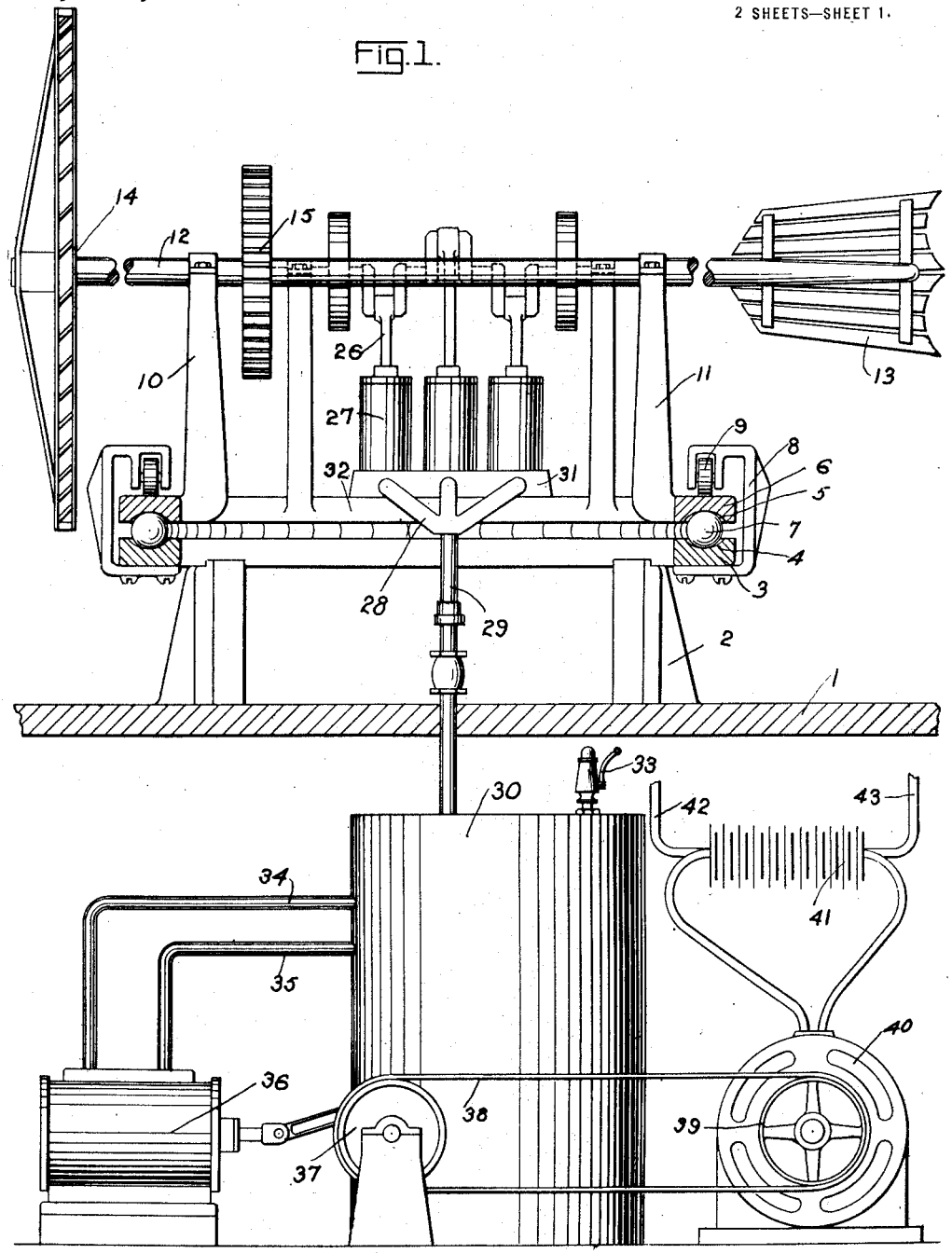

UNITED STATES PATENT OFFICE.

GEORGE YANACOPOULOS, OF NEW YORK, N. Y.

WIND-MOTOR FOR AIR-PUMPS.

1,369,596.  Specification of Letters Patent.  Patented Feb. 22, 1921.

Application filed April 5, 1919. Serial No. 287,723.

*To all whom it may concern:*

Be it known that I, GEORGE YANACOPOULOS, a citizen of the United States, and a resident of the city of New York, borough of the Bronx, in the county of Bronx and State of New York, have invented a new and Improved Wind-Motor for Air-Pumps, of which the following is a full, clear, and exact description.

This invention relates to power machines and particularly to an improved wind-operated machine which is associated with various other devices in a complete assemblage whereby electrical energy is produced therein.

One object of the invention is to provide a particular form of wind mill which may use all of its power in providing a supply of compressed air for a storage tank which is associated with an air engine and a generator whereby the compressed air may be utilized to produce electrical current either for immediate distribution or for charging a storage battery.

A further object of the invention is to provide a wind mill and pump arrangement adapted to be positioned on the top of a house or any other convenient point, with the parts so arranged that the power of the wind mill is immediately utilized by the pumps so that the energy produced will be transmitted through the medium of air to an air storage tank at a convenient point for future distribution as desired.

A further and more general object of the invention is to provide a wind mill arrangement associated with power-generating means so that a continuous supply of energy may be secured from the wind.

In the accompanying drawings—

Figure 1 is a fragmentary section view through a wind mill and associated parts disclosing an embodiment of the invention;

Fig. 2 is a top plan view of the construction shown in Fig. 1.

Fig. 3 is a fragmentary view partly in section showing a mounting of the drive shaft at one end and associated parts.

Referring to the accompanying drawings by numeral, 1 indicates a support of any kind, for instance, the roof of a house, to which brackets or uprights 2 may be secured in any desired manner, said brackets being also of any suitable structure and connected in any suitable manner to a ring 3. This ring 3 has a ball race 4 co-acting with the ball race 5 of an upper ring 6, said ball races accommodating balls 7. The ring 6 forms a platform for the pumps and associated parts hereinafter fully described. In order to prevent the rings 3 and 6 from separating, a number of encircling brackets 8 are rigidly secured to the ring 3, and overlap the ring 6, the overlapping sections having a bifurcated portion for accommodating a journal for the rollers 9. It will, of course, be evident that any desired number of brackets 8 could be provided, each being provided with a roller 9, whereby the ring 6 is held in proper position while being allowed a free rotary movement.

A pair of upstanding arms 10 and 11 are formed integral with or rigidly secured to the ring 6, said arms 10 and 11 being provided with bearing boxes at their upper ends for accommodating a shaft 12. A bar 12' extends axially of shaft 12 and carries a tailpiece 13, while the shaft 12 carries a wind wheel 14 of any usual or preferred construction. A gear wheel 15 is rigidly secured to the shaft 12, near the arm 10, said gear wheel meshing with pinions 16 and 17 supported on shafts 18 and 19. The shafts 18 and 19 are journaled in suitable arms 20 and 21, extending upwardly from the ring 6, said shafts carrying suitable fly wheels 22 and 23, as well as crank shafts 24 and 25, which are connected to suitable piston rods 26 which in turn carry suitable pistons operating in the various cylinders 27. These cylinders 27 discharge into the various branches of a manifold 28, which manifold in turn discharges through the pipe 29 into a container 30. The cylinders 27 may be supported in any desired manner, as, for instance, on the base 31, which in turn is supported by suitable extensions 32 projecting from the ring 6.

The pumps formed by the cylinders 27 and associated parts may be of any desired or usual type provided with suitable inlet and outlet valves so that the pumps will operate in the proper manner whether or not the crank shaft is operated fast or slow.

From this construction and arrangement, it will be observed that when the wind wheel 14 is being rotated by the wind, power will be transmitted to the crank shafts 24 and 25, and from thence to the air pumps, which in turn will supply compressed air to the tank. In order to prevent too great a pressure in the tank 30, a suitable relief valve 33 is connected with the tank 30 so that the wind mill may continue to operate, and any excess of air will be discharged into the atmosphere again without injuring any of the parts.

Whenever desired air may be taken from the tank 30 through either or both of the pipes 34 and 35 and transmitted to the engine 36, which is connected with a pulley 37 in such a manner as to rotate the pulley and thereby drive the belt 38 which passes over pulley 39 on the generator 40. This generator is connected to a storage battery 41 and also to busbars 42 and 43, said busbars in turn being connected to the storage battery 41 whereby when current is being taken off the busbars and the generator is operating the current will flow directly from the generator to the busbars, but when the generator is cut out current will flow then from the storage battery 41 through the busbars and thus continuously supply current.

By this method of providing compressed air and different means for converting the power into electrical energy a continuous supply of power is provided regardless of the movement of the air at different times. If during part of the day the air should not move to a sufficient extent to operate the windmill the electrical current stored in the battery 41 will tide over this stationary period of the air. Occasionally the air may blow at a very high rate of speed whereupon a greater supply of compressed air will be provided and sufficient thereof may be used to again charge the storage battery 41, while the surplus air is either retained in the container or tank 30, or is allowed to escape through the safety valve 33. Heretofore in providing means for connecting the dynamo with a windmill difficulty has been experienced in driving the dynamo at the proper speed, as the windmill itself will vary in speed. In the present construction the windmill does not supply the dynamo direct or through any means except through the use of compressed air through the engine 36 which may be operated at any desired speed to supply the dynamo. When there is not sufficient compressed air in the tank 30 to operate the engine at the same speed said engine may be cut out until a proper supply of compressed air is provided. If desired a number of engines of different capacities may be used and connected up with tank 30 so that instead of shutting down completely one or more smaller engines are operated.

What I claim is:

1. An apparatus of the character described comprising a wind wheel, a shaft connected with said wheel and rotated thereby, an upper ring structure formed with a bearing ring member, a pair of uprights for supporting said shaft and a plurality of pairs of auxiliary uprights, a plurality of series of pumps carried by said ring structure, a shaft for each series of pumps, one pair of said auxiliary uprights supporting one pump shaft, means for directing air from said pumps, means for connecting said pump shaft with a shaft connected with the wind wheel whereby when said wind wheel is operated, said pumps will be operated, and a stationary ring engaging said bearing ring member for supporting the same.

2. An apparatus of the character described comprising a supporting ring, an upper ring arranged above the supporting ring, anti-friction means arranged between said rings so that the upper ring may freely rotate, a plurality of retaining brackets carried by the supporting ring, each of the retaining brackets being provided with an anti-friction wheel bearing against the upper surface of the upper ring so as to prevent any upward movement of the upper ring, a wind wheel carried by said upper ring, and means connected with the wind wheel for transmitting power therefrom.

3. An apparatus of the character described comprising a wind wheel, a shaft for supporting the wind wheel, said shaft being rotated by said wheel, a rotatable supporting ring formed with arms upon which said shaft is mounted, said ring rotating in a horizontal plane, a fixed ring arranged below the first mentioned ring and acting as a support for the first mentioned ring, retaining members secured to said fixed ring overlapping the first mentioned ring, said retaining members having anti-friction members engaging said rotatable ring for preventing displacement thereof, and means for transmitting power from said shaft.

GEORGE YANACOPOULOS.